US008568000B2

(12) United States Patent
Yang

(10) Patent No.: US 8,568,000 B2
(45) Date of Patent: Oct. 29, 2013

(54) ANNULAR-ARRANGED LAMP CAPABLE OF BACKWARD PROJECTING BY CONCAVE SPHERE

(76) Inventor: Tai-Her Yang, Dzan-Hwa (TW)

( * ) Notice: Subject to any disclaimer, the term of this patent is extended or adjusted under 35 U.S.C. 154(b) by 241 days.

(21) Appl. No.: 13/219,791

(22) Filed: Aug. 29, 2011

(65) Prior Publication Data

US 2013/0051007 A1 Feb. 28, 2013

(51) Int. Cl.
*B60Q 1/06* (2006.01)
*F21V 29/00* (2006.01)

(52) U.S. Cl.
USPC ........... 362/373; 362/294; 362/547; 362/257; 362/218; 165/164

(58) Field of Classification Search
USPC ......... 362/298, 373, 294, 580, 547, 218, 264, 362/235; 135/164
See application file for complete search history.

(56) References Cited

U.S. PATENT DOCUMENTS

| | | | | | |
|---|---|---|---|---|---|
| 5,136,483 | A * | 8/1992 | Schoniger et al. | 362/545 |
| 5,285,356 | A * | 2/1994 | Skene et al. | 362/1 |
| 5,475,571 | A * | 12/1995 | Dassanayake | 362/560 |
| 5,924,785 | A * | 7/1999 | Zhang et al. | 362/241 |
| 6,076,948 | A * | 6/2000 | Bukosky et al. | 362/494 |
| 6,238,073 | B1 * | 5/2001 | Ito et al. | 362/544 |
| 6,474,852 | B1 * | 11/2002 | Ohkohdo et al. | 362/487 |
| 6,840,652 | B1 * | 1/2005 | Hymer | 362/235 |
| 7,441,930 | B2 * | 10/2008 | Lin | 362/410 |
| 7,530,712 | B2 * | 5/2009 | Lin et al. | 362/247 |
| 7,559,664 | B1 * | 7/2009 | Walleman et al. | 362/84 |
| 7,654,702 | B1 * | 2/2010 | Ding et al. | 362/294 |
| 7,798,675 | B2 * | 9/2010 | Chaves et al. | 362/281 |
| 7,891,839 | B2 * | 2/2011 | Yang et al. | 362/249.02 |
| 8,297,798 | B1 * | 10/2012 | Pittman et al. | 362/296.05 |
| 8,419,203 | B1 * | 4/2013 | Walker et al. | 362/97.3 |
| 2004/0001344 | A1 * | 1/2004 | Hecht | 362/555 |
| 2007/0279910 | A1 * | 12/2007 | Lin | 362/298 |
| 2009/0034252 | A1 * | 2/2009 | Engel | 362/235 |
| 2013/0003369 | A1 * | 1/2013 | Hiraoka et al. | 362/231 |

FOREIGN PATENT DOCUMENTS

| | | | |
|---|---|---|---|
| JP | 2005071702 A | * | 3/2005 |
| JP | 2009289709 A | * | 12/2009 |

* cited by examiner

*Primary Examiner* — Anne Hines
*Assistant Examiner* — Jose M Diaz
(74) *Attorney, Agent, or Firm* — Bacon & Thomas, PLLC

(57) ABSTRACT

The annular-arranged lamp capable of backward projecting by concave sphere provided by this invention is mainly provided with a side of an annular heat dissipation device being installed with light emitting devices (102) wherein the lamp is installed with two or more than two light emitting devices (110) arranged in a circular or polygonal means, and the light projecting axial line of each light emitting device (110) is projected towards a reflection device with concave sphere (103) disposed above the annular heat dissipation device (101), light beams of the light emitting devices (110) are reflected by the reflection device with concave sphere (103) then refracted to a preset projection range, thereby forming a unified light source.

2 Claims, 2 Drawing Sheets

ANNULAR-ARRANGED LAMP CAPABLE OF BACKWARD PROJECTING BY CONCAVE SPHERE

BACKGROUND OF THE INVENTION (a) Field of the Invention

This invention provides an annular-arranged lamp capable of backward projecting by concave sphere, in which two or more than two light emitting devices (110) arranged in a circular or polygonal means being annularly installed at the side of annular heat dissipation device to be installed with light emitting devices (102) of the lamp, and the light projecting axial line of each light emitting device (110) is projected towards a reflection device with concave sphere (103) disposed above the annular heat dissipation device (101), light beams of the light emitting devices (110) are reflected by the reflection device with concave sphere (103) then refracted to a preset projection range, thereby forming a unified light source.

(b) Description of the Prior Art

When a conventional lamp is configured by multiple light sources, there is a shortage of illumination deterioration due to uneven brightness formed at different locations. Such shortage shall be improved.

SUMMARY OF THE INVENTION

This invention provides an annular-arranged lamp capable of backward projecting by concave sphere, in which two or more than two light emitting devices (110) arranged in a circular or polygonal means being annularly installed at the side of annular heat dissipation device to be installed with light emitting devices (102) of the lamp, the light projection axial line of each light emitting device (110) is defined in a reverse direction which is 90 degree larger but 180 degree smaller relative to the preset final projecting direction for illuminating light of the lamp for projecting towards a reflection device with concave sphere (103) disposed above the annular heat dissipation device (101), the project surface after being reflected by a concave spherical reflection unit (104) of the reflection device with concave sphere (103) is coaxial with the final projecting direction for illuminating light beams, light beams of the light emitting devices (110) are reflected by the reflection device with concave sphere (103) then refracted to a preset projection range, thereby forming a unified light source.

DESCRIPTION OF MAIN COMPONENT SYMBOLS

Figure 1:
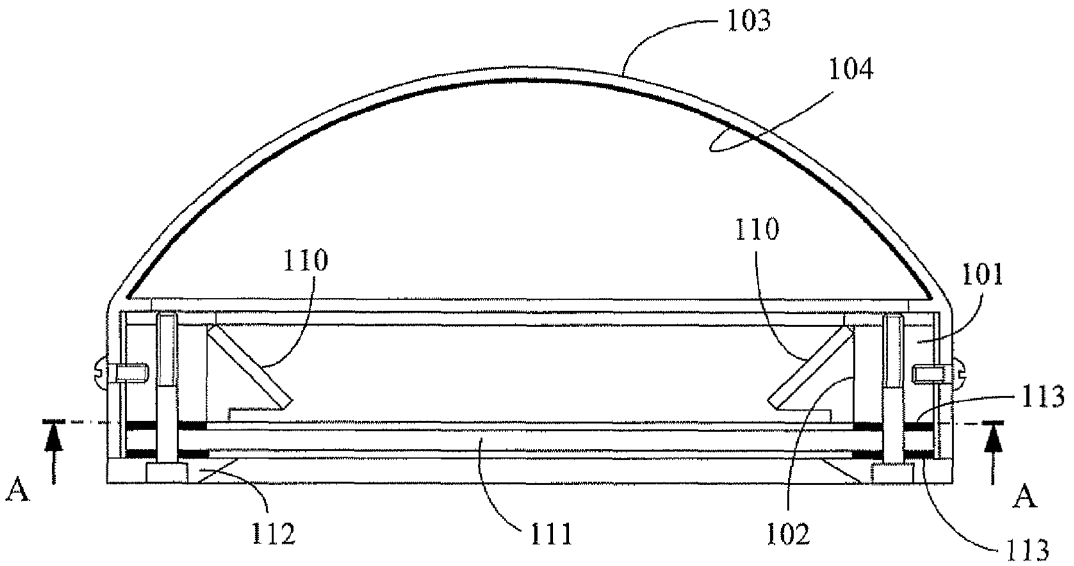
FIG. 1 is a schematic view showing the main structure of the annular heat dissipation device (101), according to this invention.

101: Annular heat dissipation device
102: A side of annular heat dissipation device to be installed with light emitting devices
103: Reflection device with concave sphere
104: Concave spherical reflection unit
110: Light emitting device
111: Light pervious protection sheet
112: Fasten ring
113: Elastic pad
200: Fluid cooling type annular heat dissipation device assembly
201: Middle annular member
202: Upper annular member
203: Lower annular member
204: Leakage-proof pad
205: Upper annular flowpath
206: Lower annular flowpath
207: Fluid pipe connector
208: Upper/lower annular flowpath through hole
302: A side of fluid cooling type heat dissipation device assembly to be installed with light emitting devices

DETAILED DESCRIPTION OF THE PREFERRED EMBODIMENTS

When a conventional lamp is configured by multiple light sources, there is a shortage of illumination deterioration due to uneven brightness formed at different locations. Such shortage shall be improved.

This invention provides an annular-arranged lamp capable of backward projecting by concave sphere, in which two or more than two light emitting devices arranged in a circular or polygonal means being annularly installed at the side of annular heat dissipation device to be installed with light emitting devices of the lamp, the light projection axial line of each light emitting device is defined in a reverse direction which is 90 degree larger but 180 degree smaller relative to the preset final projecting direction for illuminating light of the lamp for projecting towards a reflection device with concave sphere disposed above the annular heat dissipation device, the project surface after being reflected by a concave spherical reflection unit of the reflection device with concave sphere is coaxial with the final projecting direction for illuminating light beams, light beams of the light emitting devices are reflected by the reflection device with concave sphere then refracted to a preset projection range, thereby forming a unified light source.

FIG. 1 is a schematic view showing the main structure of the annular heat dissipation device (101), according to this invention.

Figure 2:
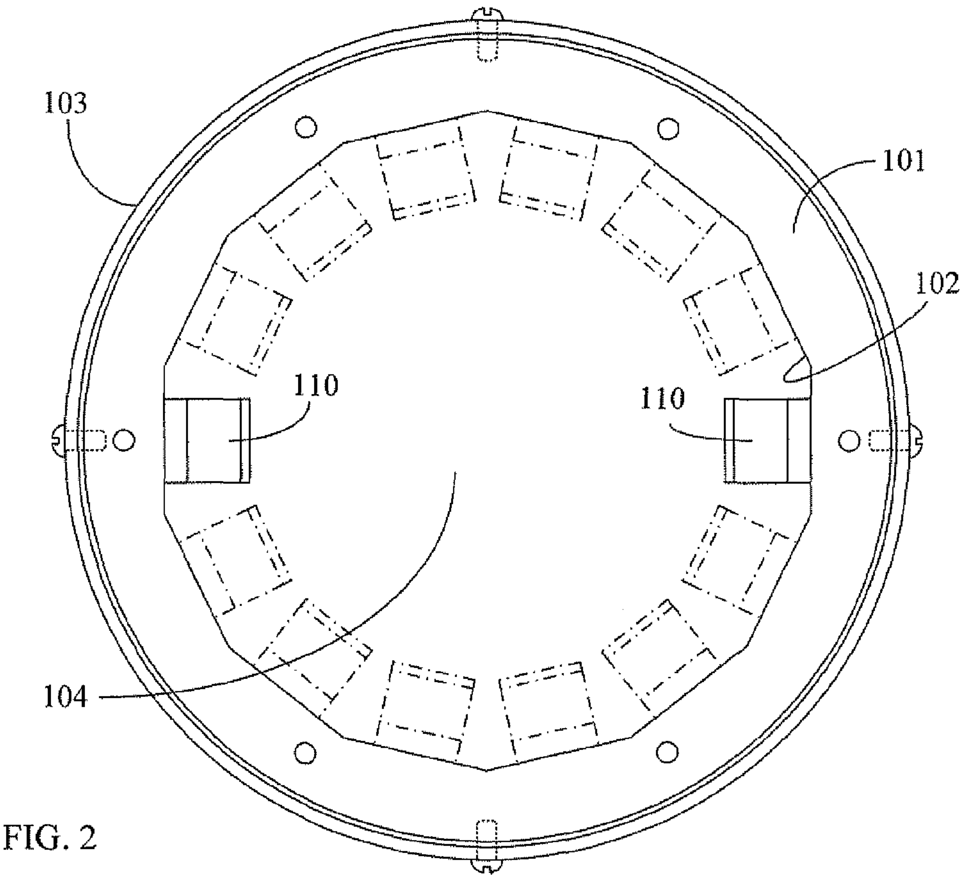
FIG. 2 is a cross sectional view of FIG. 1 taken alone an A-A line.

FIG. 2 is a cross sectional view of FIG. 1 taken alone an A-A line.

As shown FIG. 1 and FIG. 2, it mainly consists of:

Annular heat dissipation device (101): which is configured by an annular heat dissipation structure made of a heat conductive material, and combined with the reflection device with concave sphere (103), wherein the annular heat dissipation device (101) is provided with a side of annular heat dissipation device to be installed with light emitting devices (102) for the installation of two or more than two light emitting devices (110);

The side of annular heat dissipation device to be installed with light emitting devices (102): which is defined at the inner side, upper side or an upward-inclined surface of the annular heat dissipation device (101) for the installation of two or more than two of the light emitting devices (110), for projecting light beams to a concave spherical reflection unit (104) of the reflection device with concave sphere (103);

Reflection device with concave sphere (103): which is combined with the annular heat dissipation device (101), the top of the reflection device with concave sphere (103) is formed as a sphere, and the interior of the sphere is integrally formed with a concave spherical reflection unit (104) processed with a polishing or coating treatment, or a concave spherical reflection unit (104) having a high-performance reflection surface capable of being installed inside the top end of the reflection device with concave sphere (103) is separately manufactured to be assembled, the enclosure of the reflection device with concave sphere (103) is disposed at the top end and the periphery of the annular heat dissipation device (101), and the space defined between the annular bottom end thereof and the bottom end of the side of annular heat dissipation device to be installed with light emitting devices (102) is clamped with a light pervious protection sheet (111) through a fasten ring (112), and two sides of the light pervious protection sheet (111) are installed with elastic pads (113);

Concave spherical reflection unit (104): which is constituted by a concave spherical reflection unit (104) integrally formed inside the reflection device with concave sphere (103) and processed with the polishing or coating treatment, or a concave spherical unit (104) having a high-performance reflection surface capable of being installed inside the top end of the reflection device with concave sphere (103) is separately manufactured to be assembled, and the concave spherical reflection unit (104) is equipped with a high-performance light reflection capability for reflecting the light beams from the light emitting devices (110) to the final projecting direction;

The operations and functions of the assembly of the mentioned components are: the two or more than two of the light emitting devices (110) arranged in a circular or polygonal means are annularly installed at the side of annular heat dissipation device to be installed with light emitting devices (102) of the lamp, and the light projection axial line of each light emitting device (110) is defined in a reverse direction which is 90 degree larger but 180 degree smaller relative to the preset final projecting direction of the lamp for illuminating light beams, so as to project light beams to the reflection device with concave sphere (103) installed on the inner side, upper side or the upward-inclined surface of the annular heat dissipation device (101), then reflected by the concave spherical reflection unit (104) of the reflection device with concave sphere (103) to a projection surface, and for being coaxial with the final projecting direction for illuminating light beams, the light beams of the light emitting devices (110) are reflected by the reflection device with concave sphere (103) then refracted to the preset projection range, thereby forming a unified light source;

According to this invention, the annular-arranged lamp capable of backward projecting by concave sphere can be further formed in a fluid cooling type structure having flowpath therein.

Figure 3:
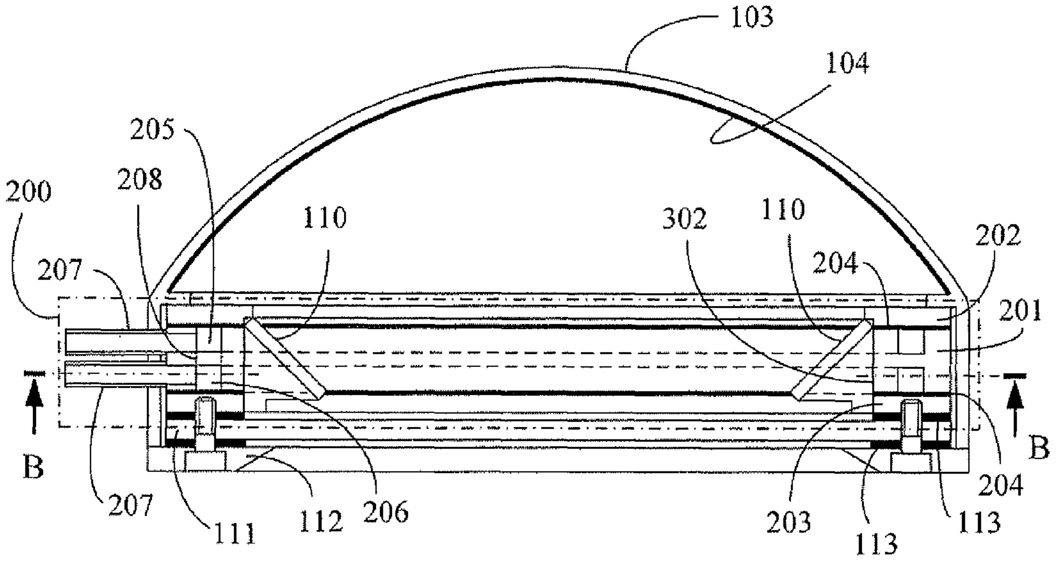
FIG. 3 is a schematic structural view showing the fluid cooling type annular heat dissipation device assembly (200) having flowpath therein, according to this invention.
Figure 4:
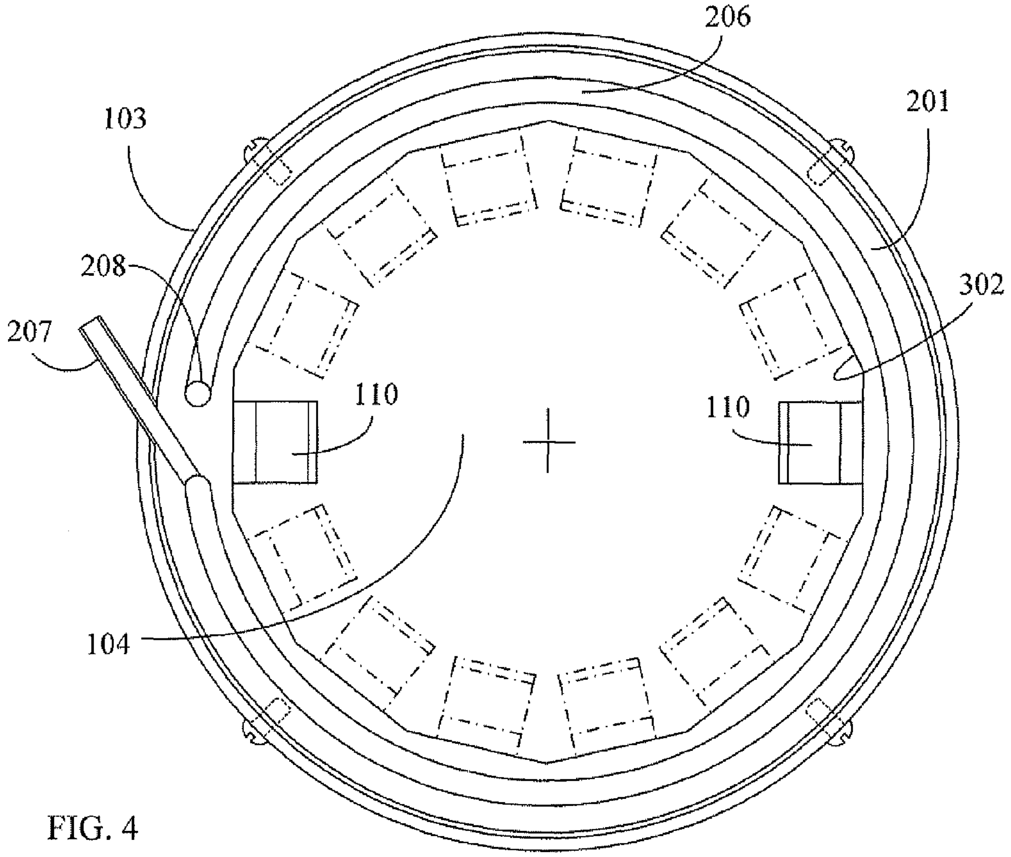
FIG. 4 is a cross sectional view of FIG. 3 taken along a B-B line.

FIG. 3 is a schematic structural view showing the fluid cooling type annular heat dissipation device assembly (200) having flowpath therein, according to this invention, FIG. 4 is a cross sectional view of FIG. 3 taken along a B-B line.

As shown in FIG. 3 and FIG. 4, it mainly consists of:

Fluid cooling type annular heat dissipation device assembly (200): which is assembled by multiple layers of annular members made of heat conductive materials for structuring the fluid cooling type annular heat dissipation device assembly having fluid flowpath, and is combined with the reflection device with concave sphere (103), the fluid cooling type annular heat dissipation device assembly (200) is formed with a side of fluid cooling type annular heat dissipation device assembly to be installed with light emitting devices (302) for the installation of two or more than two of the light emitting devices (110), wherein a middle annular member (201) is respectively installed with an upper annular flowpath (205) and a lower annular flowpath (206) at the upper and lower ends thereof, and an upper/lower annular flowpath through hole (208) is formed at the distal flowpaths ends defined at the same location angles of the upper annular flowpath (205) and the lower annular flowpath (206) for the purpose of communication;

The upper end of the middle annular member (201) is installed with an upper annular member (202), and a leakage-proof pad (204) is provided therebetween;

The lower end of the middle annular member (201) is installed with a lower annular member (203), and a leakage-proof pad (204) is provided therebetween;

By tightening the middle annular member (201), the upper annular member (202) and the lower annular member (203), flowpaths respectively in the clockwise and the counterclockwise directions are formed and respectively leaded towards a fluid pipe connector (207) for connecting with the exterior, so as to allow the fluid to flow in and flow out;

The mentioned fluid cooling type annular heat dissipation device assembly (200) includes an integrally-formed structure made of a heat conductive material in which the leakage-proof pad (204) is not provided;

The side of fluid cooling type annular heat dissipation device assembly to be installed with light emitting devices (302): the inner side, or the upper side or an upward-inclined surface of the fluid cooling type annular heat dissipation device assembly (200) is installed with two or more than two of the light emitting devices (110) for projecting light beams to the concave spherical reflection unit (104) of the reflection device with concave sphere (103);

Reflection device with concave sphere (103): which is combined with the fluid cooling type annular heat dissipation device assembly (200), the top of the reflection device with concave sphere (103) is formed as a sphere, and the interior of the sphere is integrally formed with a concave spherical unit (104) processed with a polishing or coating treatment, or a concave spherical unit (104) having a high-performance reflection surface capable of being installed inside the top end of the reflection device with concave sphere (103) is separately manufactured to be assembled, the enclosure of the reflection device with concave sphere (103) is disposed at the top end and the periphery of the fluid cooling type annular heat dissipation device assembly (200), and the space defined between the annular bottom end thereof and the bottom end of the side of annular heat dissipation device to be installed with light emitting devices (102) is clamped with a light pervious protection sheet (111) through a fasten ring (112), and two sides of the light pervious protection sheet (111) are installed with elastic pads (113);

Concave spherical reflection unit (104): which is constituted by a concave spherical reflection unit (104) integrally formed inside the reflection device with concave sphere (103) and processed with the polishing or coating treatment, or a concave spherical unit (104) having a high-performance reflection surface capable of being installed inside the top end of the reflection device with concave sphere (103) is separately manufactured to be assembled, and the concave spherical reflection unit (104) is equipped with a high-performance light reflection capability for reflecting the light beams from the light emitting devices (110) to the final projecting direction;

The operations and functions of the assembly of the mentioned components are: the two or more than two of the light emitting devices (110) arranged in a circular or polygonal means are annularly installed at the side of fluid cooling type annular heat dissipation device assembly to be installed with light emitting devices (302) of the lamp, and the light projection axial line of each light emitting device (110) is defined in a reverse direction which is 90 degree larger but 180 degree smaller relative to the preset final projecting direction of the lamp for illuminating light beams, so as to project light beams to the reflection device with concave sphere (103) installed on the inner side, upper side or the upward-inclined surface of the fluid cooling type annular heat dissipation device assembly (200), then reflected by the concave spherical reflection unit (104) of the reflection device with concave sphere (103) to a projection surface, and for being coaxial with the final projecting direction for illuminating light beams, the light beams of the light emitting devices (110) are reflected by the reflection device with concave sphere (103) then refracted to the preset projection range, thereby forming a unified light source;

According to the annular-arranged lamp capable of backward projecting by concave sphere provided by this invention, the mentioned light emitting device (110) is consisted of one or more than one of the followings, which include:

1) DC light emitting diode (LED);
2) AC light emitting diode (LED);
3) Gas lamp set;
4) Fluorescent lamp;
5) Lamp bulb.

The invention claimed is:

1. An annular-arranged lamp capable of backward projecting by concave sphere, in which two or more than two light emitting devices arranged in a circular or polygonal means being annularly installed at the side of annular heat dissipation device to be installed with light emitting devices of the lamp, the light projection axial line of each light emitting device is defined in a reverse direction which is 90 degree larger but 180 degree smaller relative to the preset final projecting direction for illuminating light of the lamp for projecting towards a reflection device with concave sphere disposed above the annular heat dissipation device, the project surface after being reflected by a concave spherical reflection unit of the reflection device with concave sphere is coaxial with the final projecting direction for illuminating light beams, light beams of the light emitting devices are reflected by the reflection device with concave sphere then refracted to a preset projection range, thereby forming a unified light source, and it mainly consists of:

annular heat dissipation device (101): which is configured by an annular heat dissipation structure made of a heat conductive material, and combined with the reflection device with concave sphere (103), wherein the annular heat dissipation device (101) is provided with a side of annular heat dissipation device to be installed with light emitting devices (102) for the installation of two or more than two light emitting devices (110);

the side of annular heat dissipation device to be installed with light emitting devices (102): which is defined at the inner side, upper side or an upward-inclined surface of the annular heat dissipation device (101) for the installation of two or more than two of the light emitting devices (110), for projecting light beams to a concave spherical reflection unit (104) of the reflection device with concave sphere (103);

reflection device with concave sphere (103): which is combined with the annular heat dissipation device (101), the top of the reflection device with concave sphere (103) is formed as a sphere, and the interior of the sphere is integrally formed with a concave spherical reflection unit (104) processed with a polishing or coating treatment, or a concave spherical reflection unit (104) having a high-performance reflection surface capable of being installed inside the top end of the reflection device with concave sphere (103) is separately manufactured to be assembled, the enclosure of the reflection device with concave sphere (103) is disposed at the top end and the periphery of the annular heat dissipation device (101), and the space defined between the annular bottom end thereof and the bottom end of the side of annular heat dissipation device to be installed with light emitting devices (102) is clamped with a light pervious protection sheet (111) through a fasten ring (112), and two sides of the light pervious protection sheet (111) are installed with elastic pads (113);

concave spherical reflection unit (104): which is constituted by a concave spherical reflection unit (104) integrally formed inside the reflection device with concave sphere (103) and processed with the polishing or coating treatment, or a concave spherical unit (104) having a high-performance reflection surface capable of being installed inside the top end of the reflection device with concave sphere (103) is separately manufactured to be assembled, and the concave spherical reflection unit (104) is equipped with a high-performance light reflection capability for reflecting the light beams from the light emitting devices (110) to the final projecting direction;

wherein it is further formed in a fluid cooling type structure having flowpath therein, and it mainly consists of: fluid cooling type annular heat dissipation device assembly (200): which is assembled by multiple layers of annular members made of heat conductive materials for structuring the fluid cooling type annular heat dissipation device assembly having fluid flowpath, and is combined with the reflection device with concave sphere (103), the fluid cooling type annular heat dissipation device assembly (200) is formed with a side of fluid cooling type annular heat dissipation device assembly to be installed with light emitting devices (302) for the installation of two or more than two of the light emitting devices (110), wherein a middle annular member (201) is respectively installed with an upper annular flowpath (205) and a lower annular flowpath (206) at the upper and lower ends thereof, and an upper/lower annular flowpath through hole (208) is formed at the distal flowpaths ends defined at the same location angles of the upper annular flowpath (205) and the lower annular flowpath (206) for the purpose of communication; the upper end of the middle annular member (201) is installed with an upper annular member (202), and a leakage-proof pad (204) is provided therebetween; the lower end of the middle annular member (201) is installed with a lower annular member (203), and a leakage-proof pad (204) is provided therebetween; by tightening the middle annular member (201), the upper annular member (202) and the lower annular member (203), flowpaths respectively in the clockwise and the counterclockwise directions are formed and respectively leaded towards a fluid pipe connector (207) for connecting with the exterior, so as to allow the fluid to flow in and flow out; the mentioned fluid cooling type annular heat dissipation device assembly (200) includes an integrally-formed structure made of a heat conductive material in which the leakage-proof pad (204) is not provided; the side of fluid cooling type annular heat dissipation device assembly to be installed with light emitting devices (302): the inner side, or the upper side or an upward-inclined surface of the fluid cooling type annular heat dissipation device assembly (200) is installed with two or more than two of the light emitting devices (110) for projecting light beams to the concave spherical reflection unit (104) of the reflection device with concave sphere (103); reflection device with concave sphere (103): which is combined with the fluid cooling type annular heat dissipation device assembly (200), the top of the reflection device with concave sphere (103) is formed as a sphere, and the interior of the sphere is integrally formed with a concave spherical unit (104) processed with a polishing or coating treatment, or a concave spherical unit (104) having a high-performance reflection surface capable of being installed inside the top end of the reflection device with concave sphere (103) is separately manufactured to be assembled, the enclosure of the reflection device with concave sphere (103) is disposed at the top end and the periphery of the fluid cooling type annular heat dissipation device assembly (200), and the space defined between the annular bottom end thereof and the bottom end of the side of annular heat dissipation device to be installed with light emitting devices (102) is clamped with a light pervious protection sheet (111) through a fasten ring (112), and two sides of the light pervious protection sheet (111) are installed with elastic pads (113).

2. An annular-arranged lamp capable of backward projecting by concave sphere as claimed in claim 1, wherein the mentioned light emitting device (110) is consisted of one or more than one of the followings, which include:

1) DC light emitting diode (LED);
2) AC light emitting diode (LED);
3) Gas lamp set;
4) Fluorescent lamp;
5) Lamp bulb.

* * * * *